March 10, 1959 A. ROSS 2,877,424
METHOD OF CONNECTING TWO CASCADED MODULATORS TO PROVIDE A VARIABLE PERCENTAGE OF MODULATIONS
Filed July 11, 1955
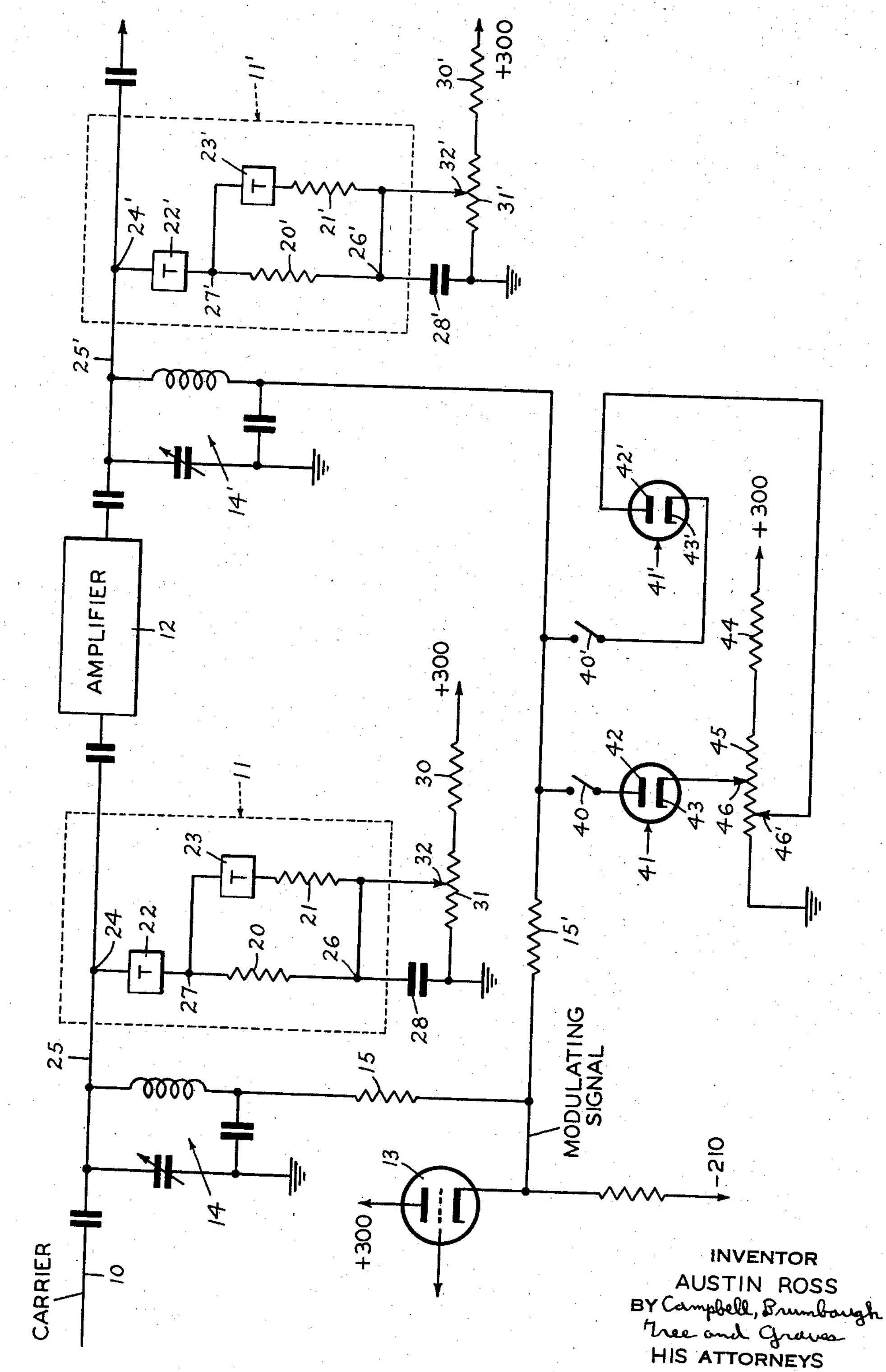
INVENTOR
AUSTIN ROSS
BY Campbell, Brumbaugh Free and Graves
HIS ATTORNEYS United States Patent Office 2,877,424
Patented Mar. 10, 1959

2,877,424

METHOD OF CONNECTING TWO CASCADED MODULATORS TO PROVIDE A VARIABLE PERCENTAGE OF MODULATIONS

Austin Ross, Monroe, Conn., assignor to Time, Incorporated, New York, N. Y., a corporation of New York Application July 11, 1955, Serial No. 521,122

13 Claims. (Cl. 332—38)

This invention relates generally to modulation apparatus, and more particularly to modulation apparatus adapted to amplitude modulate a high frequency carrier signal by a lower frequency modulating signal.

It is an object of this invention to provide reinforced modulation of a carrier signal.

It is another object of this invention to provide a selective degree of modulation of the carrier signal for different amplitude values of the modulating signal.

These and other objects are realized according to the invention by providing a transmission channel for the high frequency carrier signal, a source of the lower frequency modulating signal, a first modulator connected in the channel and with the source to modulate the carrier as a function of the modulating signal, and a second modulator connected in the channel in cascade relation with the first modulator, the second modulator being also connected with the source to further modulate the carrier as a function of the modulating signal. When selective modulation is desired, this feature is realized according to the invention by providing a modulation control means connected in circuit with at least one of the modulators to provide different degrees of modulation of the carrier by the modulating signal for different amplitude values of the modulating signal.

For a better understanding of the invention, reference is made to the following description taken in conjunction with the single figure which illustrates one embodiment of the invention described herein. In the description like elements will be designated by like reference numbers with different suffixes being used for the numbers to distinguish between the like elements. Accordingly, unless the context otherwise requires, it will be understood that the description of an element designated by a given number applies as properly to a counterpart element having the same number.

Referring now to the figure, the high frequency carrier signal is supplied to the modulation apparatus by a lead 10 and is conveyed through the apparatus by a transmission channel which includes as principal components the cascaded stages of a first modulator 11, a conventional amplifier 12 and a second modulator 11'. The modulating signal for the high frequency carrier is supplied from a source 13 which may take the form of a cathode follower. The first modulator receives its modulating signal from source 13 by way of a signal path which includes a low pass filter means 14 and an isolating means 15. The low pass filter means 14 may take the form of a parallel resonant circuit tuned to the frequency of the high frequency carrier. In its effect the resonant circuit 14 permits flow therethrough of the lower frequency modulating signal to the modulator means 11, while, simultaneously, the resonant circuit prevents flow of the high frequency carrier signal to source 13. The isolating means 15 may take the form of a resistor, and performs a function to be later described.

The modulator 11', like modulator 11, receives its modulating signal from source 13 by way of a signal path which includes the low pass filter means 14' and the isolating means 15'.

The modulator 11 is shown in the present instance as taking the form of a non-linear impedance network connected in the carrier signal transmission channel to modify the amplitude of the carrier signal as a function of the impedance of the network, this impedance being controlled by the modulating signal from source 13. This network is of the same type as the network disclosed in United States Patent 2,580,692 issued on January 1, 1952 to William West Moe. The present network comprises a plurality of linear resistors 20, 21, and a plurality of non-linear resistors 22, 23, the latter resistors being known as "Thyrite" resistors in the electrical art. The resistors 22 and 20 are connected in a series branch extending between an upper junction 24 for the network and a lower junction 26 for the network. The resistors 23 and 21 are also connected in a series branch which is connected in parallel with resistor 20 such that the non-linear resistor 23 is connected to the junction 27 of resistors 22 and 20, while the resistor 21 is connected to the lower junction 26 of the network. The upper junction 24 for the network is coupled to the lead which carries the high frequency signal. The lower junction 26 for the network is coupled to ground through a capacitor 28 which freely passes, the carrier signal but not the modulating signal, and which acts as an open circuit to ground to a direct current biasing voltage injected into the network. This biasing voltage is obtained from a voltage divider comprised of the serial connection between a positive voltage supply (not shown) and ground of a resistor 30 and another resistor 31 having a variable tap 32 thereon, the tap 32 being coupled to junction 26.

The network just described presents to the carrier signal an impedance Z given by the expression:

$$Z=KI^{-n}$$

where K is a constant, I represents the instantaneous amplitude of the modulating signal, and $n$ is an exponent of a value less than 1. By selecting appropriate values for the resistors 20—23, and by adjusting the tap 32 over resistor 31, there may be obtained various preselected modes and degrees of modulation of the high frequency signal by the modulating signal.

The modulator 11' may be comprised of a network similar to that already described for modulator means 11.

In operation the high frequency carrier signal is applied to the modulator 11. The output of this modulator varies in accordance with the modulating signal from the cathode follower 13, being high when the modulating signal is near ground potential, and decreasing as the modulating signal departs from ground potential. The output from modulator means 11 is amplified by amplifier 12, and is then applied to modulator 11' which is similar in operation to modulator 11. Since modulator 11' is controlled by the same signal as modulator 11, the result is to increase the degree of modulation of the original carrier signal by the modulating signal.

If different degrees of modulation are desired, in response to different instantaneous amplitude values of the modulating signal, this result can be obtained by utilizing, in conjunction with the above-described system, a modulation control means connected in circuit with at least one of the above-described modulators. As shown herein, this modulation control means may include a limiter means which, upon closure of a switch 40, is connected in circuit between the resonant circuit 14' and the isolating resistor 15' so that the limiter means acts upon the modulating signal flowing from cathode follower 13 to the modulating network 11'. The described limiter means may comprise, for example, a biased rectifier whose principal component is a diode 41 having its anode 42 connected to switch 40 and its cathode 43 connected to a source of adjustable D. C. voltage. This adjustable source is shown herein as the serial connection between a positive voltage supply (not shown) and ground of a resistor 44 and another resistor 45 having a variably adjustable tap 46 thereon, the tap 46 being connected to the cathode 43.

It will be seen that diode 41 will draw current when the voltage on the anode thereof exceeds the voltage supplied to its cathode from the tap 46. The described limiter means thus has the effect of eliminating from the modulating signal, as applied to the network 11', the amplitude variations in the modulating signal which exceeds a preselected intermediate amplitude value for the modulating signal, this preselected value being determined by the setting of tap 46. At the same time, the described limiter means permits amplitude variations of the modulating signal below this preselected value to reach the modulator network 11'. The over-all result is that the high frequency carrier signal is given a degree of modulation determined by both modulators 11 and 11' when the modulating signal voltage is below the level set by tap 46, and a degree of modulation determined by modulator 11 alone when the modulating signal voltage exceeds this preselected level.

From the above description, it will be seen that the isolating resistors 15 and 15' perform the useful function of preventing the limiting action of the described limiter means from affecting the modulating action of the modulator 11. The resistor 15' further serves to prevent the diode 41 from acting as a low impedance shunt across the cathode resistance of the cathode follower 13.

In some instances it is desirable that the carrier be modulated in a different manner than that already described, modulation being such that one modulator acts alone for amplitudes of the modulating signal below a preselected level and both modulators act together for amplitudes of the modulating signal above this last-named level. This form of modulation is obtained in the present instance by opening switch 40 to disconnect the first limiter means from the modulation system, and by utilizing a second limiter means. This second limiter means in most respects is similar to the first limiter means already described, but differs from the first limiter means in that the connections of the diode 41' in the second limiter means are reversed from the connections of the diode 41 in the first limiter means. In other words, in the second limiter means the cathode 43' of the diode 41' is connected to a switch 40' which (when closed) couples the diode 41' in circuit between elements 14' and 15', and the anode 42' is connected to a tap 46' which (like tap 46) is slidably adjustable on the resistor 45. The setting of tap 46' establishes a level of voltage on anode 42', equivalent to a preselected intermediate amplitude for the modulating signal flowing from cathode follower 13 to modulating network 11'. As long as the amplitude variations of the modulating signal lie below this preselected value, the diode 41' will draw current with the result that such amplitude variations are eliminated. On the other hand, when the amplitude variations of the modulating signal exceed this preselected value, the diode 41' does not draw current, and the modulating signal is applied unchanged in amplitude to the modulator network 11'. Thus the over-all result of the described second limiter means is that when the value of modulating signal is lower than a preselected value therefore set by the tap 46', the degree of modulation is determined by modulator 11 alone, whereas when the modulating signal voltage exceeds the value set by tap 46', both modulators 11 and 11' are operative, giving a higher degree of modulation.

From the description given above, it will be obvious that by closing both switches 40 and 40', it is possible to obtain a form of modulation control wherein one degree of modulation is obtained for amplitudes of the modulating signal between two preselected intermediate amplitude values for the modulating signal, and another degree of modulation for other amplitudes of the modulating signal.

The above-described embodiment being exemplary only, it will be appreciated that the present invention comprehends organizations differing in form or in detail from the presently described embodiment. For example, one of the described limiter means may be connected to have a limiting action on the modulating signal flowing to one of the modulators, while the other limiter means may be connected to have a limiting action on the modulating signal flowing to the other of the modulators. Accordingly, the invention is not to be considered as limited save as is consonant with the scope of the following claims:

I claim:

1. Modulation apparatus comprising a transmission channel for a high frequency carrier signal, a source of lower frequency modulating signal, a first passive impedance network whose impedance is controllable by a signal to vary in accordance with the signal amplitude raised to a negative exponent of a value less than one, said first network being connected in said channel to modify the amplitude of said carrier signal as a function of its network impedance and connected with said source to have its network impedance controlled as a function of said modulating signal, a second passive impedance network whose impedance is controllable by a signal to vary in accordance with the signal amplitude raised to a negative exponent of a value less than one, said second network being connected in said channel in cascade relation with said first network to further modify the amplitude of said carrier signal as a function of said second network impedance, said second network also being connected with said source to have its network impedance controlled by said modulating signal and modulation control means connected in circuit with at least one of said networks and operatively interposing a non-linear signal transfer characteristic between said source and said one network to produce a non-linear relation between the respective amplitudes of said modulating signal as manifested at said source and as received by said one network, said one network being thereby operable to provide different degrees of modulation of said carrier signal by said modulating signal for different amplitude values of said modulating signal.

2. Modulation apparatus comprising a transmission channel for a high frequency carrier signal, a source of lower frequency modulating signal, a first passive impedance network whose impedance is controllable by a signal to vary in accordance with the signal amplitude raised to a negative exponent of a value less than one, said first network being connected in said channel to modify the amplitude of said carrier signal as a function of its network impedance and connected with said source to have its network impedance controlled as a function of said modulating signal, a second passive impedance network whose impedance is controllable by a signal to vary in accordance with the signal amplitude raised to a negative exponent of a value less than one, said second network being connected in said channel in cascade relation with said first network to further modify the amplitude of said carrier signal as a function of said second network impedance, said second network also being connected with said source to have its network impedance controlled by said modulating signal, first and second low pass filter means respectively connected between said first and second networks and said source, each filter means being adapted to pass the lower frequency modulating signal from said source to the associated network while isolating said source from said high frequency carrier signal and modulation control means connected in circuit with at least one of said networks and operatively interposing a non-linear signal transfer characteristic between said source and said one network to produce a non-linear relation between the respective amplitudes of said modulating signal as manifested at said source and as received by said one network, said one network being thereby operable to provide different degrees of modulation of said carrier signal by said modulating signal for different amplitude values of said modulating signal.

3. Modulator apparatus comprising a transmission channel for a high frequency carrier signal, a source of lower frequency modulating signal, first modulator means connected in said channel and with said source to modulate said carrier signal as a function of said modulating signal, second modulator means connected in said channel in cascade relation with said first modulator means, said second modulator means being also connected with said source to further modulate said carrier as a function of said modulating signal, and modulation control means connected in circuit with at least one of said modulator means and operatively interposing a non-linear signal transfer characteristic between said source and said one modulator means to produce a non-linear relation between the respective amplitudes of said modulating signal as manifested at said source and as applied to said one modulator means, said modulator control means being thereby operable to provide different degrees of modulation of said carrier signal by said modulating signal for different amplitude values of said modulating signal.

4. Modulation apparatus as in claim 3 wherein said modulation control means provides different degrees of modulation of said carrier signal in different amplitude ranges of said modulating signal adjacent each other at a preselected intermediate amplitude value for said modulating signal.

5. Modulation apparatus as in claim 4 wherein said modulation control means provides different degrees of modulation of said carrier signal in response to amplitudes of said modulating signal between two preselected intermediate amplitude values therefor, and in response to other amplitudes of said modulating signal.

6. Modulator apparatus comprising a transmission channel for a high frequency carrier signal, a source of lower frequency modulating signal, first modulator means connected in said channel and with said source to modulate said carrier signal as a function of said modulating signal, second modulator means connected in said channel in cascade relation with said first modulator means, said second modulator means being also connected with said source to further modulate said carrier as a function of said modulating signal, limiter means connected in circuit between said source and one of said modulator means to eliminate from said modulating signal as applied to said one modulator means the amplitude variations thereof in a range bounded at one end by a preselected intermediate amplitude value for said modulating signal, and isolating means connected between said limiter means and the other modulator means to preclude said limiter means from limiting the modulating action of the other modulator means.

7. Modulation apparatus as in claim 6 wherein said limiter means comprises a biased rectifier.

8. Modulation apparatus as in claim 6 wherein said limiter means eliminates amplitude variations of said modulating signal in an amplitude range lower than said preselected intermediate amplitude value.

9. Modulation apparatus as in claim 6 wherein said limiter eliminates amplitude variations of said modulating signal in an amplitude range higher than said preselected intermediate amplitude value.

10. Modulator apparatus comprising a transmission channel for a high frequency carrier signal, a source of lower frequency modulating signal, first modulator means connected in said channel and with said source to modulate said carrier signal as a function of said modulating signal, second modulator means connected in said channel in cascade relation with said first modulator means, said second modulator means being also connected with said source to further modulate said carrier as a function of said modulating signal, first limiter means connected in circuit between said source and said modulator means to eliminate from said modulating signal as applied to at least one of said modulator means the amplitude variations thereof which are lower than a preselected intermediate amplitude value for said modulating signal, and second limiter means connected in circuit between said source and said modulator means to eliminate from said modulating signal as applied to at least one of said modulator means the amplitude variations thereof which are greater than another preselected intermediate amplitude value for said modulating signal.

11. Modulation apparatus according to claim 10 wherein said first and second limiter means are connected in parallel with each other and are both connected between said source and one of said modulator means, said apparatus being further characterized by isolating means connected between said paralleled limiter means and the other modulator means to preclude either of said limiter means from limiting the modulating action of the other modulator means.

12. Modulation apparatus according to claim 10 wherein said first and second limiter means each comprise biased rectifiers of which one is connected to draw current from said source and the other is connected to supply current to said source.

13. Modulator apparatus comprising a transmission channel for a high frequency carrier signal, a source of lower frequency modulating signal, first modulator means connected in said channel and with said source to receive said modulating signal and to modulate said carrier signal as a function of the amplitude of the received modulating signal raised to a negative exponent of a value less than one, second modulator means connected in said channel in cascade relation with said first modulator means, said second modulator means being also connected with said source to receive said modulating signal and to further modulate said carrier as a function of the amplitude of the received modulating signal raised to a negative exponent of a value less than one, and modulation control means connected in circuit with at least one of said modulator means and operatively interposing a non-linear signal transfer characteristic between said source and said one modulator means to produce a non-linear relation between the respective amplitudes of said modulating signal as manifested at said source and as received by said one modulator means, said modulator means being thereby operable to provide different degrees of modulation of said carrier signal by said modulating signal for different amplitude values of said modulating signal.

References Cited in the file of this patent

UNITED STATES PATENTS

| | | |
|---|---|---|
| 1,744,836 | Ohl | Jan. 28, 1930 |
| 2,020,409 | Green | Nov. 12, 1935 |
| 2,362,898 | Gilman | Nov. 14, 1944 |
| 2,436,066 | Favre | Feb. 17, 1948 |
| 2,498,677 | Grieg | Feb. 28, 1950 |